United States Patent [19]
Schneider

[11] 3,835,544
[45] Sept. 17, 1974

[54] IMPACT-PROTECTED GEAR UNIT FOR MEASURING TOOLS
[75] Inventor: Wilhelm Schneider, Niedernhall, Germany
[73] Assignee: Schneider & Kern, Niedernhall, Germany
[22] Filed: Nov. 17, 1972
[21] Appl. No.: 307,562

Related U.S. Application Data
[63] Continuation-in-part of Ser. No. 222,483, Feb. 1, 1972, abandoned.

[30] Foreign Application Priority Data
Feb. 18, 1972  Germany............................ 2207601

[52] U.S. Cl.............................. 33/147 J, 33/DIG. 6
[51] Int. Cl. ............................................. G01b 5/00
[58] Field of Search................... 33/143 R–143 L, 147 R–147 N, 146, DIG. 6; 76/409

[56] References Cited
FOREIGN PATENTS OR APPLICATIONS
489,774   6/1970   Switzerland........................ 33/147 J Primary Examiner—John W. Huckert
Assistant Examiner—Jon W. Henry
Attorney, Agent, or Firm—Michael S. Striker

[57] ABSTRACT

A slide of a measuring tool is movable along a rack and carries at least one pinion meshing with the rack. At least one transmitting disk which is rotatable on the pinion shaft and connected by gears to the indicator shaft is further connected to the pinion by a special spring so that, when the movement of the slide is suddenly stopped, the inertia of the transmitting disk continues to turn the latter and thus also the indicator shaft for a certain distance against the action of the spring which will subsequently draw the transmitting disk and the indicator shaft back to the position which corresponds to the exact measurement made by the slide.

14 Claims, 7 Drawing Figures

IMPACT-PROTECTED GEAR UNIT FOR MEASURING TOOLS

BACKGROUND OF THE INVENTION

This application is a continuation-in-part of my application Ser. No. 222,483, filed on Feb. 1, 1972 and now abandoned.

The present invention relates to an impact-protected gear unit for measuring tools, for instance a slide caliper, a micrometer gauge, a height measuring or marking gauge or the like, which permit a certain distance to be measured by means of a slide which is movable along a ruler or vice versa and in which this movement is transmitted by a rack and one or more gears to a rotary indicator. Such an indicator may be a pointer which is turnable relative to a stationary dial, or a rotary dial which may be turned relative to a stationary marking.

More particularly, the invention relates to an impact protection arrangement for such a gear unit.

In the prior-art measuring tools of the type in question, sudden stopping of the slide — which may be the result of contact of the engaging jaw of the tool with a workpiece being measured — is transmitted to and results in equally abrupt stopping of the components which transmit motion from the slide to the indicator. Quite frequently this results in damage to these components. This damage may either make the tool immediately inoperable, or, since such tools are often precision measuring tools, may necessitate that the tool be repaired or discarded because of inaccurate measurements resulting from such damage.

SUMMARY OF THE INVENTION

It is therefore an object of the present invention to overcome this disadvantage of the prior art.

More particularly, it is the principal object of this invention to provide an impact-protected gear unit for a measuring tool in which a sudden stop of the slide relative to the ruler will not also cause a sudden stop of the movable parts of the gear unit, and especially of the shaft carrying the indicator.

The gear unit according to the invention is to be provided with impact-protecting means which prevent the different parts of a measuring tool and its gearing from being damaged due to a sudden stop of the movable parts when during a measuring operation the measuring tool hits against the article to be measured.

For attaining these objects, the present invention provides that if, when carrying out a measuring operation, the slide of the measuring tool hits with an impact upon the article to be measured and is thus abruptly stopped, the rotary indicator on the slide will not also be immediately stopped but will at first continue to turn for a short distance in the same direction as previously. During this additional movement a braking action will be exerted by suitable spring means upon the rotary elements which are provided on the slide, and the indicator will finally be turned back by these spring means to the particular position which accurately indicates the value that has actually been measured.

It is a further object of the invention to eliminate the effects of the unavoidable play between the elements of the measuring gear unit, so that each position to which the slide is adjusted relative to the ruler will correspond exactly to a particular angular position of the shaft which turns the indicator. For attaining this object, the invention provides that in any position in which the slide is located on the ruler or to which it is shifted thereon, the pinions or gears which are driven by the rack will always remain in engagement with the flanks of the teeth of the rack.

One of the inventive features of the impact-protected gear unit for a measuring tool which converts the shifting movement of a slide relative to a ruler by means of a rack and one or more gears to a rotary indication, consists in transmitting the movement by means of a transmitting disk which is provided with at least one stop member which is acted upon by a driving surface on a driving disk when the latter moves in one direction and which during the movement in the opposite direction is held by a spring in contact with the driving surface of the driving disk so that if the driving disk is suddenly stopped during its movement in the first direction, the transmitting disk will at first continue to turn for a certain angular distance due to its inertia, and will subsequently be drawn back by the spring until the stop member on the transmitting disk again engages upon the driving surface of the driving disk.

Another feature of the invention consists in providing the transmitting disk with two stop members which are in engagement with two driving disks, one of which is driven by the rack through a first pinion, while the second driving disk is driven by the rack through a second pinion. The second driving disk is driven by means of the second pinion through a spring which tends to turn the second driving disk in one direction relative to the first driving disk so that, if both drive pinions are suddenly stopped and therefore the first driving disk which is rigidly connected to the first drive pinion is likewise stopped, the second driving disk will at first continue to turn for a certain angular distance relative to the transmitting disk and will then be drawn back against the driving surface of the second driving disk. In this construction the flanks of the gear teeth of the two drive pinions will be pressed tightly in opposite directions against the flanks of the teeth of the rack.

The gear unit according to the invention has the effect that, if the drive pinions are turned in either direction and are then suddenly stopped, the pinion on the indicator shaft which carries the rotary indicator in the form of a pointer or a dial will, due to the effect of inertia, at first continue to turn for a certain distance beyond the position which corresponds to the actual measured value and will then be drawn back by spring force to this position which is exactly determined by the positive engagement of different parts of the gear unit upon each other.

The gear unit according to the invention has the further advantage that in any position of the slide along the ruler the flanks of the two drive pinions will press in opposite directions against the flanks of the teeth of the rack and will thus eliminate any play in the gear unit so that, when a measurement has been carried out and the indicator has moved or returned to a certain position, this position indicates exactly the distance by which the jaws or other measuring parts of the measuring tool are spaced from each other.

Evidently, the arrangement according to the present invention should be as small as possible. The thus imposed size limitation sometimes poses a problem with respect to the spring or springs to be used; if tension springs are employed it is sometimes difficult to so select the spring characteristics and configurations that the springs are sufficiently stiff to assure reliable protection against impact damage, but on the other hand are sufficiently resilient to prevent their permanent deformation over a period of use. The latter is evidently undesirable, because it leads to a weakening of the spring force and thus results in measuring errors due to inadequate return movement of the indicator to the zero setting.

A further feature of the invention overcomes this by providing a pressure spring or springs, which acts between an abutment connected with the drive pinion and the transmitting disk. Such a construction can be very small, but yet the spring or springs will have a greater elasticity and resistance to permanent deformation than could be obtained with tension springs. Thus, reliable impact protection over long periods of time is assured, without having to accept any deterioration in the accuracy of measurements which are preferred with the tool.

The pressure spring may have a hook-shaped portion, and a substantially straight portion extending from the hook-shaped portion. The free end of the hook-shaped portion may engage the abutment which is connected with the drive pinion, and the straight portion may engage the transmitting disk, or vice versa. Such an arrangement and configuration of the spring meets the above-outlined requirements.

If the gear unit utilizes at least one driving disk which is coupled with the drive pinion in motion-transmitting relationship and is provided with the abutment for the spring, then it may be advantageous to provide the transmitting disk with a slot, preferably a substantially radially extending one, in which the free end of the hook-shaped portion of the spring is engaged. The straight portion then engages the abutment in pretensioned condition. Such a construction requires very little space and is simple and inexpensive; moreover, it makes possible the full utilization of the substantial elasticity possessed by pressure springs which are configurated in the manner described, and to thus avoid measuring errors even after prolonged use of the tool.

It has been previously pointed out that the gear unit may also have two driving disks, rather than one. If so, one of them will be connected with the drive pinion for rotation therewith, while the other driving disk is rotatable relative to the drive pinion and acts upon the indicator of the tool. Each of the driving disks has an arcuate slot into which extends an abutment of the transmitting disk. Two springs are provided, each elastically urging one of the abutments against an abutment face of the respectively associated driving disk, so as to provide impact protection irrespective of the direction of rotation of the rotary components. In such a construction the use of pressure springs is also possible. The two abutments of the transmitting disk need merely be provided at one and the same point of the transmitting disk; advantageously, they can be constituted by a pin extending through the transmitting disk and having end portions projecting from the opposite major surfaces of the disk. The slots for receiving the free ends of the hook-shaped portion of the respective springs, and the spring abutments on the driving disks are located substantially diametrally opposite one another, and the pressure springs are configurated as described earlier. Such a construction is quite simple and permits ready assembly and disassembly of the various components, while affording the sought-after advantages.

The novel features which are considered as characteristics for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
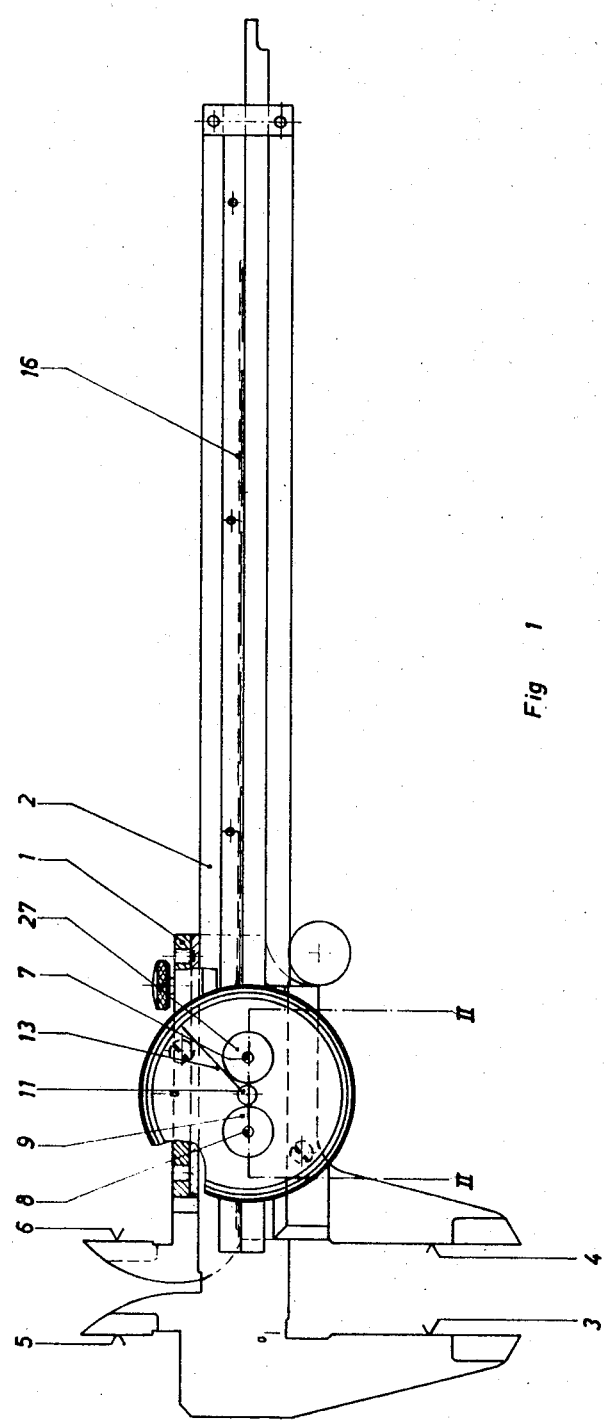
FIG. 1 is a plan view of a caliper embodying the present invention.

In the drawings, FIG. 1 shows a slide caliper to which the invention may be applied. The invention is, however, not limited to calipers, but may likewise be applied to other measuring tools in which the longitudinal displacement of two movable parts relative to each other is to be measured and the measured value is to be transmitted to a rotary component of an indicating device. Insofar as the invention is concerned, it is immaterial whether the indicating device includes a pointer which is pivoted relative to a stationary dial or whether it includes a rotary dial which is turned relative to a stationary marking.

The caliper as illustrated has a slide 1 which may be shifted along a ruler or guide 2. The extent of this shifting forms a linear measurment which may be measured between the jaws 3 and 4 or the jaws 5 and 6. Rigidly secured to the ruler 2 is a rack 16 which, when slide 1 is shifted, drives two pinions 7 and 8 which in turn are adapted to drive a gear 9 and a gear 27 in a manner which will hereafter be described in greater detail with reference to FIG. 2. These gears are, in turn, adapted to drive a pinion 11 which is secured to an indicator shaft 12 provided with a pointer 13. The present invention relates particularly to the impact protection of the drive means of a rotary indicator, for example, a pointer, of a measuring tool.

Figure 2:
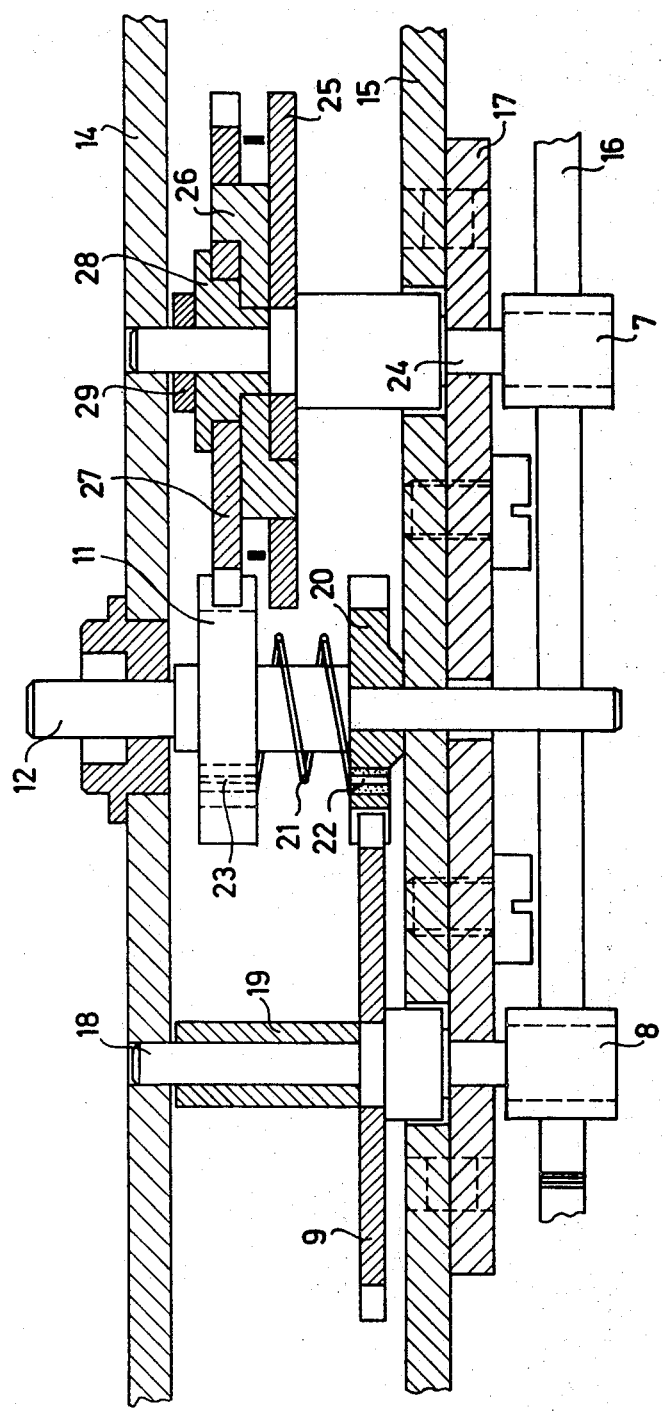
FIG. 2 is an enlarged cross-sectional view illustrating the gear unit of the caliper shown in FIG. 1.

As illustrated in FIG. 2, the gear unit for driving the indicator shaft 12 is mounted between an upper bearing plate 14 and a lower bearing plate 15 which are screwed together and are equally spaced from each other by suitable means, not shown. The upper bearing plate 14 is also screwed together with the slide 1 in a manner not shown and is therefore movable with the latter relative to the rack 16 which is secured to the ruler 2, as shown in FIG. 1. The lower bearing plate 15 carries an additional bearing plate 17 which is likewise secured thereto by screws.

A first drive shaft 18, on which the drive pinion 8 and the drive gear 9 are secured is rotatably mounted in bearing plates 14 and 17. In its axial direction, shaft 8 is maintained in the proper position by a spacing tube 19. Drive gear 9 meshes with a pinion 20 which is rotatably mounted on the indicator shaft 12 which, in turn, is rotatably mounted in the bearing plates 14 and 15 and on which the pinion 11 for driving the indicator shaft 12 is rigidly secured. Pinion 20 is driven by the drive pinion 8 through the first drive shaft 18 and the drive gear 9; it is therefore rotatable relative to the indicator shaft 12 and to the pinion 11 which is rigidly secured to this shaft. The indicator shaft 12 carries and is adapted to turn the pointer 13, as shown in FIG. 1, and its part between the pinions 11 and 20 is surrounded by a coil spring 21 one end of which is secured to the pinion 11 whereas its other end is secured to the pinion 20.

This spring 21 thus forms a driving connection between the drive pinion 8 and the pinion 11 of the indicator shaft 12; it is maintained under a continuous uniform tension in one direction of rotation in a manner as will be later described in detail. Due to this driving connection, the shifting movement of the slide 1, which is screwed together with the bearing plate 14 and moves along the ruler 2 and the rack 16 which is secured to the latter, is converted into a rotary movement which causes the indicator shaft 12 and the pointer 13 thereon to be turned accordingly.

The indicator pinion 11 will then be additionally driven — in a manner as will be later described in detail — by the drive pinion 7 which is secured to the second drive shaft 24 through a driving disk 25 which latter is rigidly connected to shaft 24, and through a transmitting disk 26 which is rotatably mounted on shaft 24, and further through a drive gear 27 which is likewise rotatable relative to shaft 24 and also relative to the transmitting disk 26. The bearing of drive gear 27 consists of a bushing 28 which is secured by a force fit to shaft 24. Additionally, a washer 29 on shaft 24 spaces the bushing 28 and the drive gear 27 at the proper distance from the bearing plate 14.

During the assembly of the entire gear unit as described the two drive pinions 7 and 8 are connected to the rack 16; however, before this is done, one of these pinions is turned for about one half revolution relative to the other pinion and thus relative to the released position of spring 21, so that this spring will be tightened, which has the effect that the two drive pinions 7 and 8 will press in opposite direction against the flanks of racks 16. This has the result that when slide 1 is shifted along the ruler 2, any gear play in the gear unit will be prevented and the indicator shaft 12 will be turned very accurately to a position which corresponds to the particular position to which the slide 1 has been shifted.

Figure 3:
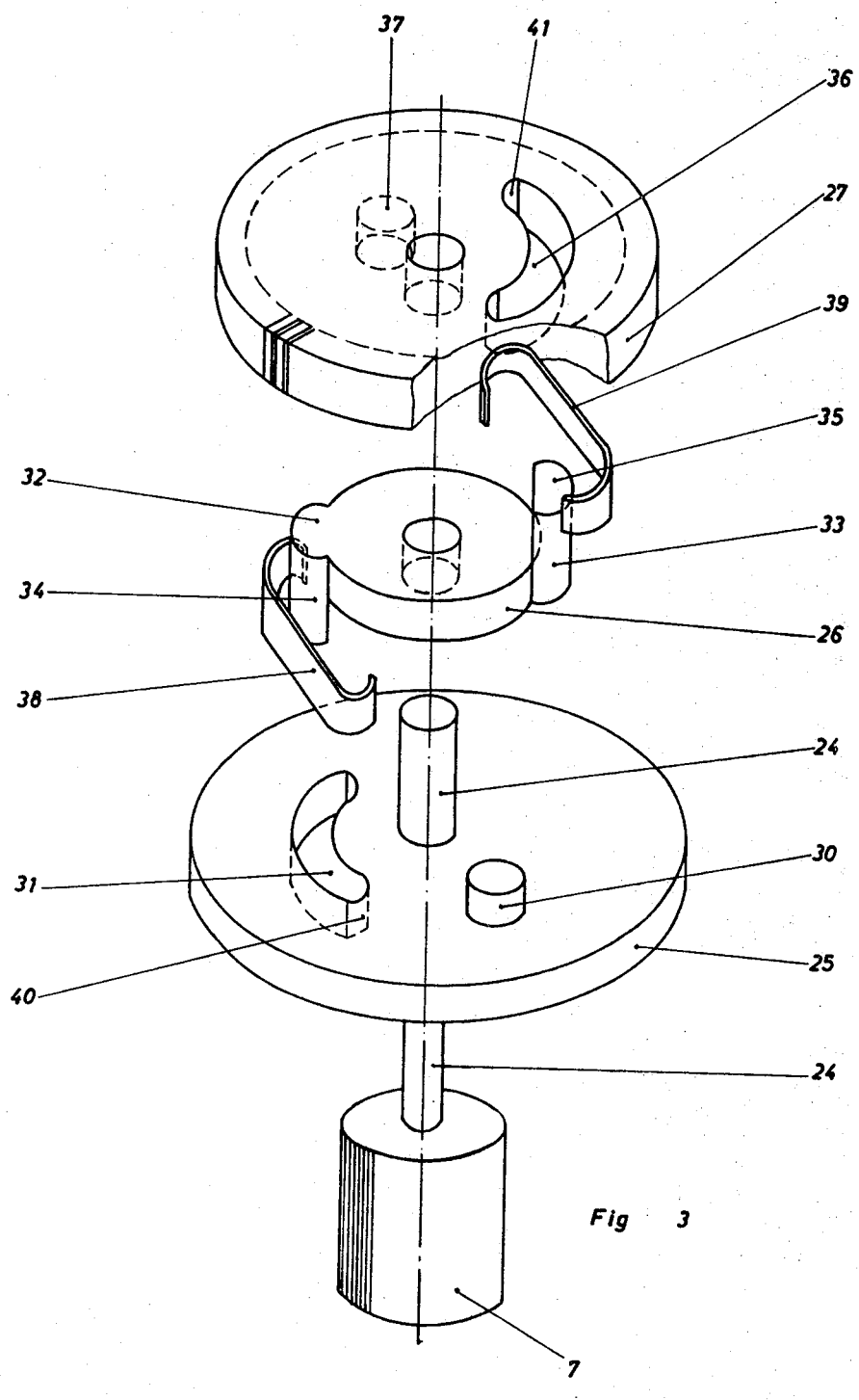
FIG. 3 is an exploded view, illustrating portions of the gear unit in FIG. 2.

FIG. 3 shows an exploded view of the means for connecting the drive pinion 7 with the drive gear 27. Driving disk 25, which is rigidly connected to shaft 24 and thus also to drive pinion 7, is provided with a short upwardly projecting pin 30 and with an arcuate slot 31 of a certain length which is curved about the axis of shaft 24. A similar arcuate slot 36 is provided in drive gear 27, which is rotatable on shaft 4 and is also provided with a short pin 37 which, however, projects downwardly from gear 27. The transmitting disk 26 is rotatably mounted on drive shaft 24, intermediate driving disk 25 and drive gear 27, and is provided with a first projection 32 and a second stop projection 33 which are disposed diametrically opposite to each other and form bulges projecting in radial directions from the peripheral surface of the disk 26. The first projection 32 has an extension which projects downwardly beyond the lower surface of the tramsitting disk 26 and forms a first stop pin 34; the second projection 33 has an extension which projects upwardly beyond the upper surface of disk 26 and forms a second stop pin 35. When disks 25 and 26 and gear 27 are properly assembled, the first stop pin 34 projects from disk 26 downwardly into the slot 31 in driving disk 25 and the second stop pin 35 projects from disk 26 upwardly into the slot 36 in drive gear 27.

Figure 4:
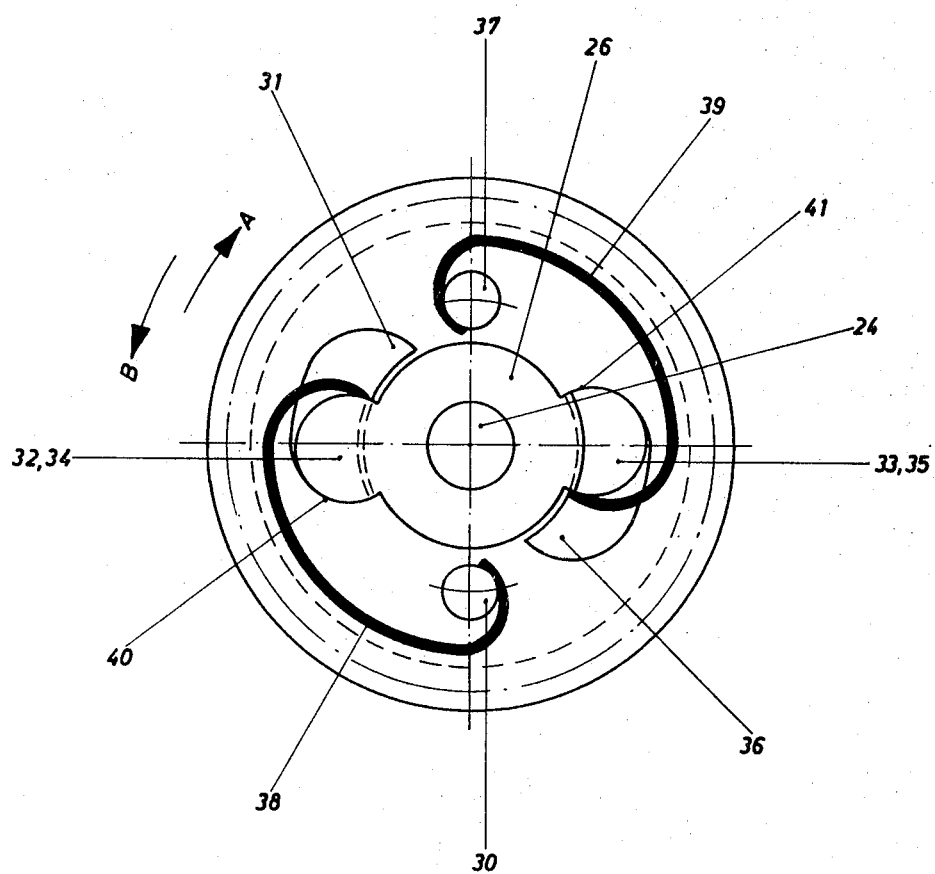
FIG. 4 is a diagrammatic plan view illustrating the operation of the gear unit portions shown in FIG. 3.

The driving means for connecting the drive pinion 7 with the drive gear 7 further comprise two curved leaf-type tension springs 38 and 39. When the different parts of the drive unit as shown in FIG. 3 are properly assembled and in the position as shown in FIG. 4, one end of spring 38 engages upon the projection 32 and its other end upon pin 30. The first stop pin 34 on disk 26 which projects into the arcuate slot 31 in disk 25 is thus drawn by spring 38 against the end surface 40 of this slot. Similarly, one end of the second spring 39 engages upon the projection 33 and its other end upon pin 37, and spring 39 thus draws the second stop pin 35 in slot 36 of gear 27 against the end surface 41 of this slot.

The impact protection feature as previously described operates as follows: If the drive pinion 7 together with the driving disk 25 are driven in the direction of the arrow A, as shown in FIG. 4, the end surface 40 of slot 31 will act upon the stop pin 34 on disk 26 and turn the latter likewise in the direction of the arrow A. Since stop pin 35 will be equally turned, spring 39 will draw the pin 37 and thus the drive gear 27 likewise in the direction of the arrow A. If, however, the drive pinion 7 and thus also the driving disk 25 are suddenly stopped, because in a measuring operation the slide 1 is rapidly shifted along ruler 2 and rack 16 until jaw 4 or jaw 6 hits with an impact upon the article to be measured, the inertia of the transmitting disk 26 will cause the latter to continue to turn for a certain distance against the force of spring 38 which acts between pin 30 on the driving disk 25 and the stop projection 32 on stop disk 26. However, due to the force of spring 38, disk 26 will be slowed down and stopped and thereafter the stop pin 34 will again be drawn back by spring 38 against the end surface 40 of slot 31. The pointer 13 may therefore at first deflect beyond the mark on the dial which would indicate the position in which the drive pinion 7 is suddenly stopped on rack 16 and it will then be pivoted back to this mark which is exactly determined by the engagement of the stop pin 34 upon the end surface 40 of the arcuate slot 31.

When the transmitting disk 26 at first travels beyond the final position which is determined by the engagement of the end surface 40 of slot 31 with the stop pin 34, the other stop projection 33 on the transmitting disk 36 will be likewise turned which by means of the spring 39 will at first resiliently draw the pin 37 and thus the gear 27 in the same direction. This further travel of gear 27 may occur even if the other drive pinion 8 is in a stationary position, since this pinion 8 and gear 27 are connected to each other by the coil spring 21. By means of the pinion 11 on the indicator shaft 12, this coil spring 21 will then again draw the drive gear 27 in the reverse direction, until the stop pin 35 on disk 26 again abuts against the end surface 41 of the slot 36 in gear 27 and the other stop pin 34 on disk 26 abuts against the end surface 40 of slot 31 in the driving disk 25, so that gear 27 is thus again in the position which is determined by the particular location to which the slide 1 has been shifted relative to the ruler 2.

If the driving disk 25 is turned in the direction of the arrow B, as shown in FIG. 4, disk 25 will draw the transmitting disk 26 in the same direction by means of the stop pin 30 on disk 25 and the spring 38 which connects this pin to the stop projection 32 on disk 26, while the stop pin 34 abuts continuously against the end surface 40 of slot 31. Drive gear 27, upon which an initial tension relative to the driving disk 25 is then exerted by the coil spring 21, then draws the transmitting disk 26 in the direction of the arrow B by means of pin 37 on gear 27 and the spring 39 which connects this pin with the projection 33 on stop disk 26 and insures that the stop pin 35 on the projection 33 will always be pressed against the end surface 41 of slot 36 in gear 27. If during the rotation in this direction B pinion 7 and 8 are suddenly stopped, drive gear 27 will due to its inertia and by action of the coil spring 21 at first continue to travel for a certain distance in the same direction B against the force of spring 39, so that the end surface 41 of slot 36 will disengage from the stop pin 35 of disk 26 until spring 39 again draws the transmitting disk 26 back to the position in which the projection 35 abuts against the end surface 41 of slot 36.

From the foregoing description it is evident that, if the drive pinions 7 and 8 are suddenly stopped on rack 16 in either direction of their movement along the rack, the pointer 13 on the indicator shaft 12 will at first be further deflected in the respective direction and will then return to the particular position which corresponds to the actual adjustment of the slide. Furthermore, due to the provision of coilspring 21, the flanks of the teeth of pinions 7 and 8 will at all times press in opposite directions against the flanks of the teeth of rack 16 so that any gear play in the gear unit will be eliminated.

Figure 5:
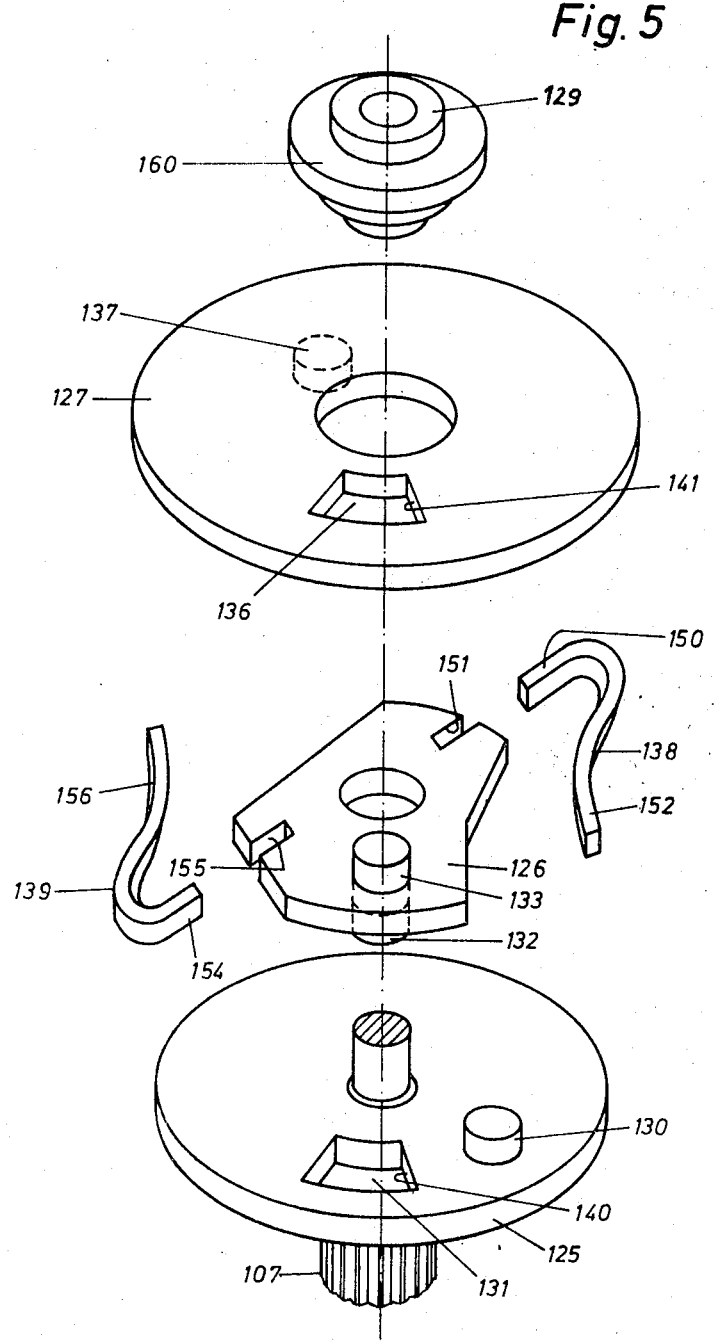
FIG. 5 is a view similar to FIG. 3, but illustrating a further embodiment of the invention.
Figure 7:
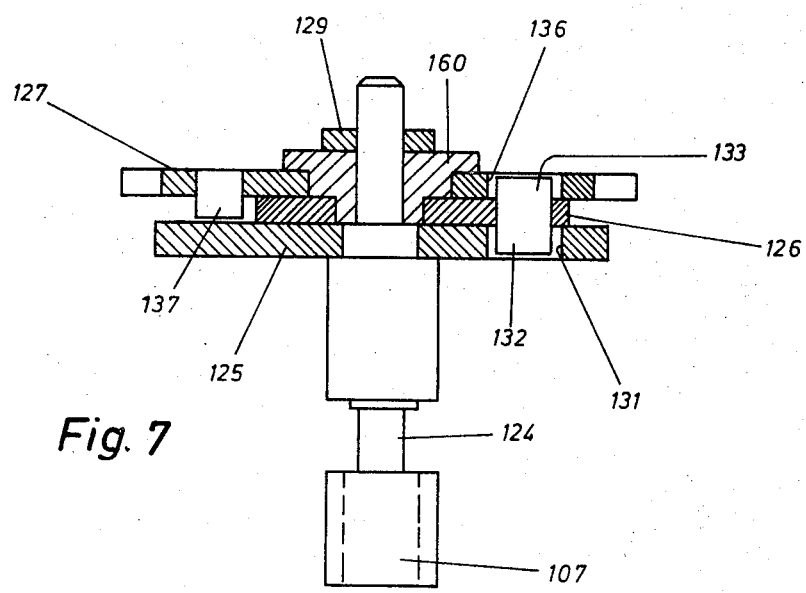
FIG. 7 is a section taken on line VII—VII of FIG. 6.
Figure 6:
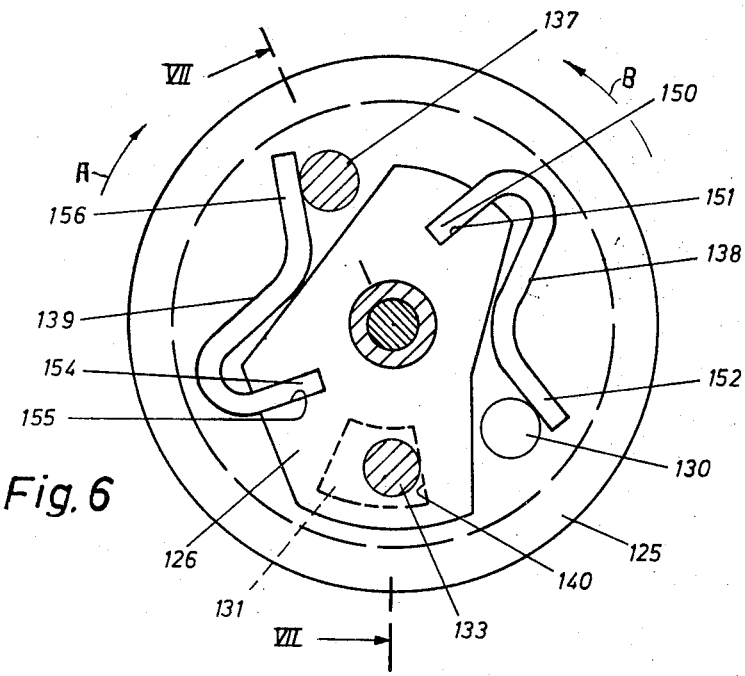
FIG. 6 is a partially sectioned top plan view of the embodiment in FIG. 5, with portions omitted for the sake of clarity.

In the embodiment of FIGS. 5–7, which largely corresponds to that of FIGS. 1–4, like elements are designated with the same reference numerals except prefixed by a 100 series. Reference numeral 107 is a drive pinion corresponding to the pinion 7 in FIGS. 1–4; as does the pinion 7, the drive pinion 107 meshes with the teeth of a non-illustrated rack. The pinion 107 is connected via a shaft 124 in non-rotatable relationship with a first driving disk 125. Spaced from the latter, turnable freely with reference to the same, is a second driving disk 127 which is configurated as a gear (see FIG. 7) and is arranged coaxially with reference to the disk 125. A transmitting disk 126 is arranged between and coaxial with reference to the disks 125 and 127, being freely turnable with reference to both of them.

As the drawing shows, especially in FIG. 5, the transmitting disk 126 is plate-shaped and resembles a segment of a circular plate. It is provided with two abutments 132 and 133 which are located one above the other and project from opposite major surfaces of the disk 126. Advantageously, and as illustrated, the abutments 132 and 133 are the opposite end portions of a pin which extends through the disk 126 and is fastened therein. One of these end portions, namely the one designed with reference numeral 132, extends towards the disk 125, and the end portion 133 extends towards the disk 127. The disk 125 has a curved slot 131 into which the end portion 132 extends, and a similar curved slot 136 is provided in the disk 127 and receives the end portion 133.

Thus far, this embodiment resembles the embodiment of FIGS. 1–4 quite closely, except for the somewhat different configuration of some of the components and for the longitudinal alignment of the end portions 132 and 133 which, of course, replace the abutments 32 and 33 of the preceding embodiment.

The disk 132 is provided with a projection 130 which extends toward the disk 127 and serves as a spring abutment; the projection 130 is not long enough to contact the disk 127. A pressure spring 128 having a substantially hook-shaped portion and a substantially straight portion, is retained between the projection 130 and the transmitting disk 126 for elastically coupling the two disks with one another. The spring 138 has on its substantially V-shaped hook-like portion a free arm 150 which extends into a substantially radial slot 151 of the transmitting disk 126. A substantially straight free arm 152 of the spring 138 extends from the exterior in pre-tensioned condition into abutment with the outer surface of the projection 130, so that the spring 138 is pre-tensioned (compare FIG. 6). This means that the transmitting disk 126 is so under stress with respect to the first drive disk 125 that the abutment 132 is urged against the end face 140 of the slot 131 provided in the disk 125.

The second spring 139 cooperates between the disks 126 and 127. The latter is provided with a projection 137 facing towards but not contacting the disk 125; it is located substantially diametrally opposite the projection 130, as is particularly clearly visible in FIG. 6. The free end portion 154 of the spring 139 is lodged in a substantially radial slot 155 of the transmitting disk 126, with the slot 155 being approximately diametrally opposite the slot 151. The other free end portion 156 of the spring 139 presses from the outside against the outer circumferential surface of the projection 137, with the spring 139 being under pre-tension and thus urging the abutment 133 against the end face 141 of the slot 136 in the disk 127. The end faces 140 and 141 are located one above the other and are not normally offset relative to one another in the circumferential direction of the respective disks.

While, as has already been pointed out, the first driving disk 125 is mounted on the shaft 124 so that it can rotate with but not relative to the same, and with the pinion 107, the second driving disk 127 is similarly rigidly connected with a stepped guide member 160 which is turnable with reference to the shaft 124 and on which the transmitting disk 126 is freely turnably journalled (note the hole in the drive disk 126 and the corresponding projection of the element 160) with reference to the disks 125 and 127. An annular member 129 is press fitted on the shaft 124 above the element 160 in order to prevent axial separation of the various components.

If the pinion 107 and thus the drive disk 125 are turned in the direction of the arrow A shown in FIG. 6, the end face 140 acts upon the abutment 142 of the transmitting disk 126, turning the latter in the direction of the arrow A. The spring 139 presses against the projection 137 of the drive disk 127, so that the latter is taken along in the direction of the arrow A; the abutment 133 is maintained in contact with the end face 141 by the spring 139. If, after rotation in the direction of the arrow A is underway, the drive pinion 107 is suddenly stopped from further rotation (for instance as a result of the engagement of a jaw of the tool with an object to be measured), then the transmitting disk 26 can initially continue turning in the direction of the arrow A and against the force of the spring 138 by a certain extent, due to its inertia. Similar turning movement of the drive disk 127 by the same angle can take place, being transmitted to the drive disk 127 via the spring 139 and the projection 137. However, the force of the spring 138 brakes the transmitting disk 126. When the movement of the latter in the direction of the arrow A has come to a stop, the transmitting disk 126 is now rotated in the opposite direction until the abutment 132 moves into contact with the end face 140.

It will be understood that for instance the pointer of a non-illustrated indicating arrangement, which has motion transmitted to it via the drive disk 127, can initially move past the measured location determined by the sudden cessation of rotation of the drive pinion 107, but is subsequently returned to this location which is then precisely defined by the contacting of the abutment 132 with the end face 140. During the rotation of the disk 126 in the direction of the arrow A, and while the disk 126 continues its movement in this direction before it is moved in the opposite direction, a relative rotation of the drive disk 127 with reference to the transmitting disk 126 is prevented by the spring 139, the projection 137, the end face 141 and the abutment 133.

If the pinion 107 and thereby the drive disk 125 are rotated in the direction of the arrow B shown in FIG. 6, then the transmitting disk 126 is taken along in the same direction via the projection 130 and the pressure spring 138. During such movement the abutment 132 is always in contact with the end face 140. The second drive disk 127 is taken along in the direction of the arrow B by the abutment 133 which is in contact with the end face 141. If a certain cessation of the rotation of the pinion 107 in the direction of the arrow B takes place, then the drive disk 127 can move away with its end face 141 from the abutment 133, counter to the force of the spring 129 and in the direction of the arrow B; this movement can continue through a certain angle and as it takes place the disk 127 is braked to a stop by the spring 139. Thereupon, the spring 139 returns the disk 127 until the abutment 133 is again engaged by the end face 141, so that the operation here is the same as described with respect to the rotation in the direction of the arrow A.

Of course, this embodiment can also use two pinions, that is a first and a second drive pinion as is described with reference to the embodiment in FIGS. 1–4. The operation will be the same. However, by the particular construction of the springs 138 and 139, and by the fact that they act as pressure springs rather than tension springs, an elastic springy deformation of the straight portions 152 and 56, respectively, of the springs 138 and 139 is obtained in operation. This, in conjunction with a similar elastic deformation of the respective hook-shaped portions of the springs assures that the springs can absorb stresses over a long period of useful life without undergoing permanent deformation and thus loosing some of their spring force which would lead to the inaccuracies that have been earlier described. This embodiment makes its possible to use springs of quite large elasticity and excellent resistance to perment deformation, so that the desired impact protection coupled with accuracy of measurement over a long period of time is assured.

It will be understood that each of the elements described above, or two or more together, may also find a useful application in other types of applications differing from the types described above.

While the invention has been illustrated and described as embodied in an impact-protected gear unit for measuring tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An impact-protected gear unit for a measuring tool having a rack, a slide movable along said rack, indicating means rotatably mounted on said slide, and gear means mounted on said slide for converting the sliding movement of said slide into a rotary movement of said indicating means, said gear unit comprising a pinion rotatably mounted on said slide and meshing with said rack, a driving disk engaged and rotatable with said pinion, a transmitting disk rotatable relative to said driving disk, means for mounting said transmitting disk so as to be rotatable independently of said driving disk and said pinion, a first stop member secured to said driving disk and an associated second stop member secured to said transmitting disk, a spring resiliently connecting said driving disk to said transmitting disk, means connecting said transmitting disk to said indicating means to transmit the rotary movements of said transmitting disk to said indicating means so that when said slide is shifted in a first of two opposite longitudinal directions along said rack, rotation of said pinion and said driving disk in a corresponding first rotary direction results and will be transmitted by said spring to said transmitting disk and from the latter via said connecting means to said indicating means, said spring normally maintaining said two stop members in abutting engagement with each other during said rotation in said first rotary direction until said movement of said slide in said first longitudinal direction along said rack and the corresponding rotation of said pinion and said driving disk in said first rotary direction is abruptly stopped, while said transmitting disk continues to rotate further due to its inertia in said first rotary direction against the action of said spring, whereby said first and second stop members separate from each other until said spring stops said further rotation of said transmitting disk in said first rotary direction and then draws the latter back in an opposite rotary direction until said two stop members again abut against each other.

2. An impact-protected gear unit for a measuring tool having a rack, a slide movable along said rack, indicating means rotatably mounted on said slide, and gear means mounted on said slide for converting the sliding movement of said slide into a rotary movement of said indicating means, said gear unit comprising a pinion rotatably mounted on said slide and meshing with said rack, a driving disk engaged and rotatable with said pinion, a transmitting disk rotatable relative to said driving disk, means for mounting said transmitting disk so as to be rotatable independently of said driving disk and said pinion, first stop means on said driving disk and associated second stop means on said transmitting disk, spring means resiliently connecting said driving disk to said transmitting disk, means connecting said transmitting disk to said indicating means to transmit the rotary movements of said transmitting disk to said indicating means so that when said slide is shifted in a first of two opposite longitudinal directions along said rack, rotation of said pinion and said driving disk in a corresponding first rotary direction results and will be transmitted by said spring means to said transmitting disk and from the latter via said connecting means to said indicating means, said spring means normally maintaining said two stop means in abutting engagement with each other during said rotation in said first rotary direction until said movement of said slide in said first longitudinal direction along said rack and the corresponding rotation of said pinion and said driving disk in said first rotary direction is abruptly stopped, while said transmitting disk continues to rotate further due to its inertia in said first rotary direction against the action of said spring means, whereby said first and second stop means disengage each other until said spring means stops said further rotation of said transmitting disk in said first rotary direction and then draws the latter back in an opposite rotary direction until said stop means again abut against each other.

3. An impact-protected gear unit as defined in claim 2, wherein said first stop member is located substantially midway between said additional slots in the circumferential direction of said driving disks.

4. An impact-protected gear unit as defined in claim 2, wherein said expansion springs are located substantially diametrally opposite one another.

5. An impact-protected gear unit as defined in claim 1, wherein said spring is a contraction spring.

6. An impact-protected gear unit as defined in claim 1, wherein said spring is an expansion spring.

7. An impact-protected gear unit as defined in claim 6, said pinion being fixedly connected with an abutment, and said expansion spring having spaced portions which biasingly engage said abutment and said transmitting disk, respectively.

8. An impact-protected gear unit as defined in claim 7, one of said spaced portions being a hook-shaped end portion of said spring, and the other of said spaced portions being a substantially straight end portion which extends from said hook-shaped end portion.

9. An impact-protected gear unit as defined in claim 8, wherein said transmitting disk has an outer periphery provided with an inwardly extending slot; and wherein said hook-shaped end portion engages in said slot and said substantially straight end portion biasingly engages said abutment.

10. An impact-protected gear unit as defined in claim 1, further comprising a second pinion rotatably mounted on said slide and meshing with said rack, a second driving disk, means for rotatably mounting said second driving disk on said slide so as to be rotatable independently of said first driving disk and said transmitting disk coaxial thereto, said transmitting disk being disposed between said first and second driving disks, connecting means associated with and operative for transmitting the rotation of said second pinion to said second driving disk, a third stop member secured to said second driving disk and an associated fourth stop member secured to said transmitting disk, and a second spring resiliently connecting said second driving disk to said transmitting disk and normally maintaining said third and fourth stop members in abutting engagement with each other until movement of said slide in a second longitudinal direction opposite to said first longitudinal direction along said rack and the corresponding rotation of said first and second pinion and said second driving disk in a second rotational direction opposite to said first rotational direction is suddenly stopped and said transmitting disk due to its inertia then continues to turn in said second rotational direction against the action of said second spring, whereby said third and fourth stop members separate from each other until said second spring stops said further rotation of said transmitting disk in said second rotational direction and then draws said transmitting disk back in said first rotational direction until said third and fourth stop members again abut against each other.

11. An impact-protected gear unit as defined in claim 10, in which each of said driving disks at the opposite sides of said transmitting disk is provided with a slot extending arcuately about the common axis of said disks, a first end of said slot in said first driving disk forming said first stop member and an opposite second end of said slot in said second driving disk forming said third stop member, said second and fourth stop members on said transmitting disk consisting of a pair of short pins projecting in opposite directions from the opposite sides of said transmitting disk into said slots and being slidable therein, and each of said pins normally abutting under the action of one of said springs against the respective first and second ends of said slots into which it projects.

12. An impact-protected gear unit as defined in claim 10, in which said connecting means for transmitting the rotation of said second pinion to said second driving disk comprise resilient means having a preliminary tension causing one of the flanks of each tooth of said first pinion engaging into a tooth gap of said rack to press in one direction against one flank of a tooth of said rack and causing another flank of each tooth of the second pinion in said rack to press in the opposite direction against another flank of a tooth of said rack.

13. An impact-protected gear unit as defined in claim 11, further comprising three shafts rotatably mounted on said slide parallel to each other, said first pinion and said first driving disk being mounted on and secured to the first of said shafts, said transmitting disk and said second driving disk also being mounted on but rotatable relative to said first shaft, said second driving disk having gear teeth, said second pinion and a first gear mounted on and secured to the second shaft, the third shaft forming an indicator shaft, an indicator rigidly connected to said indicator shaft, a second gear mounted on and secured to said indicator shaft and meshing with the gear teeth of said second driving disk, a third gear mounted on and rotatable relative to said indicator shaft and meshing with said first gear, said resilient means forming a coil spring surrounding said indicator shaft between said second and third gears, the opposite ends of said coil spring being secured under an initial tension of said spring to said second and third gears.

14. An impact-protected gear unit as defined in claim 8, said driving disk rotatable with said pinion being a first driving disk and having a circumferentially extending first arcuate slot; further comprising a second driving disk axially spaced from and paralleling said first driving disk, said second driving disk being coaxial with and turnable relative to said first driving disk and being provided with an additional stop member substantially diametrally opposite said first stop member and with a circumferentially extending second arcuate slot; means for mounting said transmitting disk intermediate and rotatable relative to said driving disks; a pair of coaxial projections extending to opposite axial sides of said driving disk and each received in one of said slots; a pair of diametrally opposite additional slots each extending inward from the periphery of said transmitting disk; and an additional expansion spring similar to the first-mentioned one, the hook-shaped end-portion of each spring being engaged in a respective additional slot, and the straight end portion of the same spring biasingly engaging one of said first stop members.

* * * * *